H. S. ERB.
HOOF PROTECTOR.
APPLICATION FILED DEC. 10, 1910.

1,036,592.

Patented Aug. 27, 1912.

WITNESSES
B. P. Faltin
M. L. Lefevre.

INVENTOR
Harmony S. Erb.,
BY
John J. Thompson
ATTORNEY

COLUMBIA PLANOGRAPH CO., WASHINGTON, D. C.

UNITED STATES PATENT OFFICE.

HARMONY S. ERB, OF LANCASTER, PENNSYLVANIA.

HOOF-PROTECTOR.

1,036,592.  Specification of Letters Patent.  Patented Aug. 27, 1912.

Application filed December 10, 1910. Serial No. 596,594.

*To all whom it may concern:*

Be it known that I, HARMONY S. ERB, a citizen of the United States, residing at Lancaster, in the county of Lancaster and State of Pennsylvania, have invented certain new and useful Improvements in Hoof-Protectors, of which the following is a specification, reference being had therein to the accompanying drawing.

This invention relates to a hoof protector for horses or mules and is in the form of a plate or inner shoe to be secured between the shoe and the hoof in such a manner as to entirely protect the hoof and frog of the animal from injury by stones, nails or other injuries.

One object of this invention is to provide a hoof protector of this class which shall entirely cover the tender portion of the foot and heel.

Another object of the invention is to construct a protector that will be light, thus adding little weight to the foot, and still be of sufficiently strong metal to withstand and turn the points of nails and other sharp objects on which the animal may tread.

With these and other objects in view, my invention consists in the construction which will hereinafter be fully described and claimed in the annexed specification, and illustrated in the accompanying drawings, which form a part of this application, and in which like figures of reference refer to corresponding parts in all of the views; but it is fully understood that while I have here described my invention as here shown, that I do not confine myself to the exact design, as slight changes may be made in the construction and design without departing from the spirit of the invention.

Figure 1:
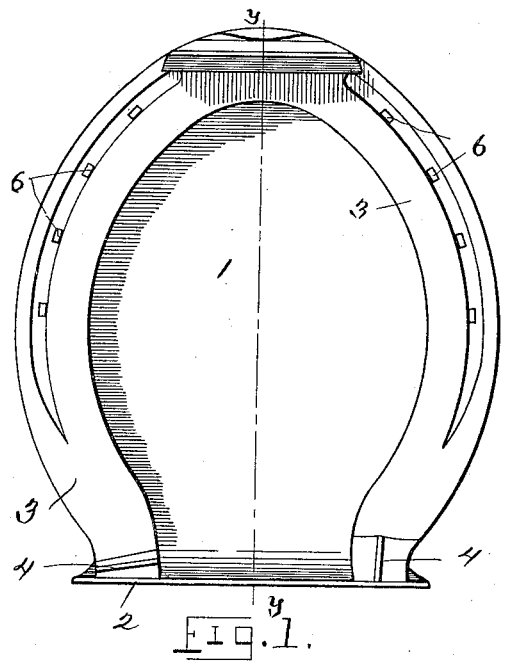
Figure 2:
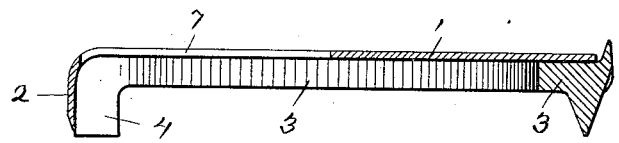
Figure 3:
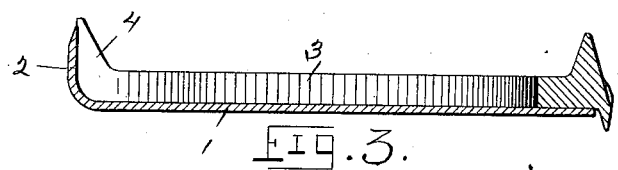
Figure 4:
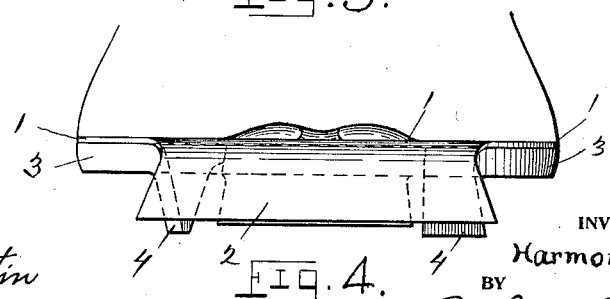

In the drawings:—Figure 1, is a bottom plan view, shown in relation to the shoe. Fig. 2, is a vertical sectional view of the parts shown in Fig. 1, taken on the line X—X. Fig. 3, is a vertical sectional view of the parts shown in Fig. 2, taken on the line Y—Y. Fig. 4, is a rear elevation, showing the device as applied to the hoof and shoe.

Referring to the drawings, 1, indicates a thin metallic plate made to conform to the shape of the shoe 3. Said plate 1, is formed with the heel flange 2, which projects downward back of the heel calks 4, of the shoe 3. The plate 1, is also provided with a series of nail holes 5, which register with the nail holes 6, of the shoe, so that the shoe attaching nails can pass therethrough and thus secure it to the hoof. The flange portion 2, not only tends to provide further protection for the heel, but also provides a heel calk as well.

Having thus described my invention what I claim as new and desire to secure by Letters Patent is:—

In a hoof protector of the class described, the combination with a thin flat metallic plate conforming to the shape of the shoe and provided with nail holes registering with the nail holes in the main shoe, of a depending heel flange integral with said plate of approximately the same width as the heel of the main shoe, and in contact with the rear faces of the calks of the main shoe.

In testimony whereof I affix my signature in presence of two witnesses.

HARMONY S. ERB.

Witnesses:
 WM. J. COULTER,
 JOHN J. THOMPSON.

Copies of this patent may be obtained for five cents each, by addressing the "Commissioner of Patents, Washington, D. C."